United States Patent
Ramsey et al.

(10) Patent No.: US 7,398,293 B2
(45) Date of Patent: Jul. 8, 2008

(54) SYSTEM AND METHOD FOR USING A SHARED BUS FOR VIDEO COMMUNICATIONS

(75) Inventors: Scott M. Ramsey, Austin, TX (US); Michael W. Kolb, Austin, TX (US); Jinsaku Masuyama, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 648 days.

(21) Appl. No.: 10/124,400

(22) Filed: Apr. 17, 2002

(65) Prior Publication Data

US 2003/0200345 A1      Oct. 23, 2003

(51) Int. Cl.
*G06F 15/16* (2006.01)
(52) U.S. Cl. .............. 709/204; 709/223; 709/224; 710/305; 710/315
(58) Field of Classification Search ........... 710/305, 710/315; 709/223–224
See application file for complete search history.

(56) References Cited

U.S. PATENT DOCUMENTS

| | | | | |
|---|---|---|---|---|
| 5,721,842 A | 2/1998 | Beasley et al. | ............. | 395/311 |
| 5,884,096 A | 3/1999 | Beasley et al. | ............. | 395/858 |
| 5,971,804 A | 10/1999 | Gallagher et al. | ........... | 439/581 |
| 6,134,613 A * | 10/2000 | Stephenson et al. | ......... | 710/313 |
| 6,157,534 A | 12/2000 | Gallagher et al. | ........... | 361/683 |
| 6,188,571 B1 | 2/2001 | Roganti et al. | ............. | 361/685 |
| 6,256,014 B1 | 7/2001 | Thomas et al. | ............. | 345/163 |
| 6,300,847 B1 | 10/2001 | Gallagher et al. | ............. | 333/33 |
| 6,304,895 B1 | 10/2001 | Schneider et al. | ........... | 709/203 |
| 6,324,605 B1 | 11/2001 | Rafferty et al. | ............ | 710/100 |
| 6,757,748 B1 * | 6/2004 | Hipp | ............................ | 710/2 |
| 6,904,482 B2 * | 6/2005 | Rietze et al. | ................ | 710/107 |
| 6,931,568 B2 * | 8/2005 | Abbondanzio et al. | ........ | 714/11 |
| 2002/0007463 A1 * | 1/2002 | Fung | ........................ | 713/320 |
| 2002/0143996 A1 * | 10/2002 | Odryna et al. | .............. | 709/246 |
| 2002/0194412 A1 * | 12/2002 | Bottom | ...................... | 710/302 |
| 2003/0088655 A1 * | 5/2003 | Leigh et al. | ................. | 709/223 |
| 2003/0200473 A1 * | 10/2003 | Fung | .......................... | 713/320 |

* cited by examiner

*Primary Examiner*—Bunjob Jaroenchonwanit
*Assistant Examiner*—Duyen M Doan
(74) *Attorney, Agent, or Firm*—Baker Botts L.L.P.

(57) ABSTRACT

A system and method for using a shared bus to control a keyboard, video, and mouse (KVM) output is disclosed. The system may include a mid-plane having a video bus. At least one server module, including a video output module, may be placed in communications with the video bus. The video output module may transmit a video signal over the bus and receives a control signal over the bus. A management module may also be placed in communications with the video bus. The management module may receive the video signal from the server module via the bus and provide a control signal through the video bus to each server module. The control signal may activate or deactivate the video output module on each server module.

19 Claims, 4 Drawing Sheets

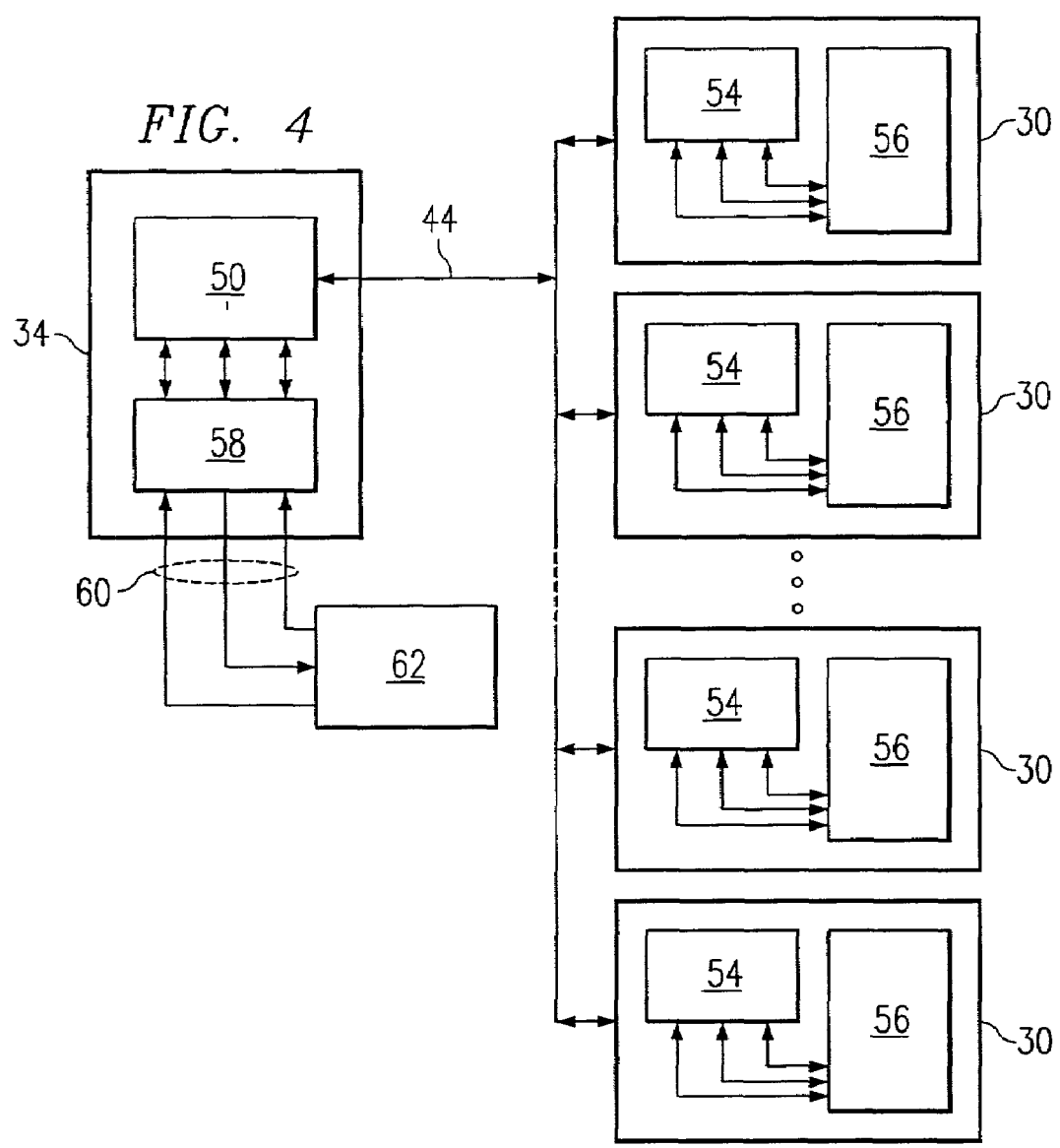
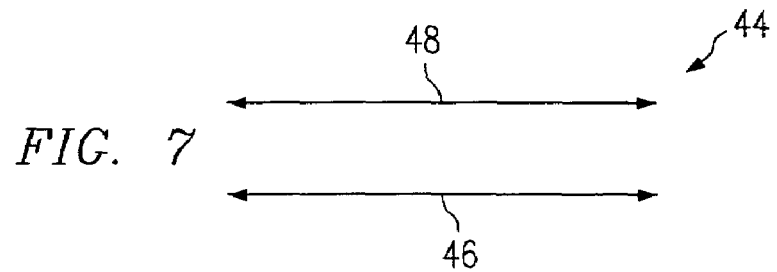

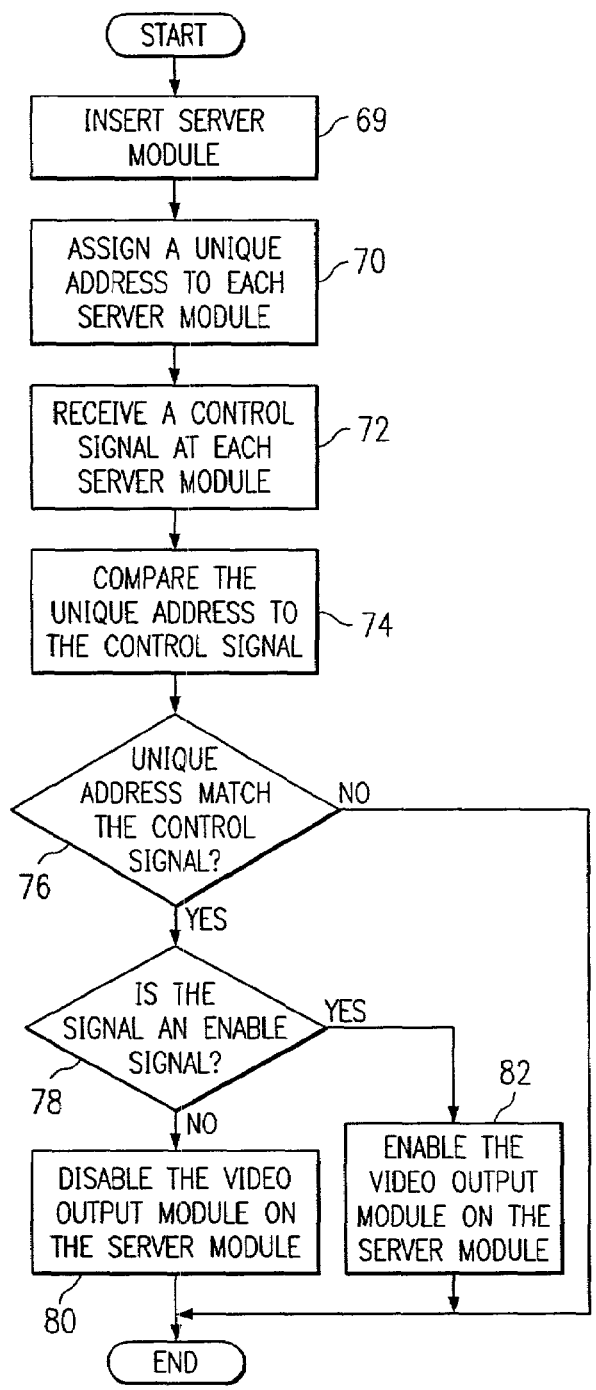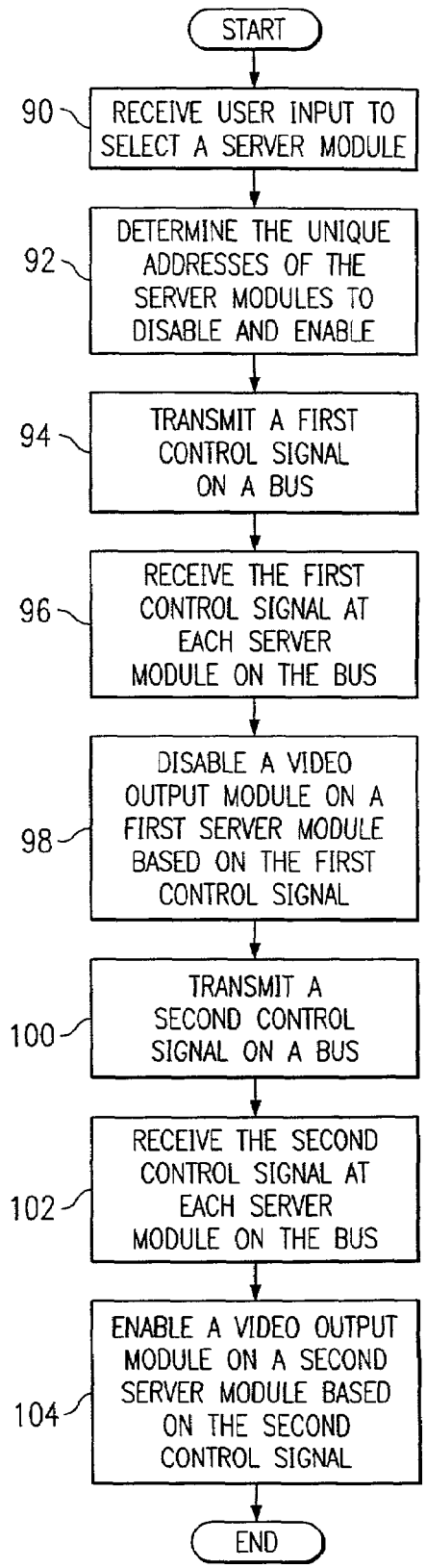

SYSTEM AND METHOD FOR USING A SHARED BUS FOR VIDEO COMMUNICATIONS

TECHNICAL FIELD OF THE INVENTION

This disclosure relates in general to the field of computer component communications, and more particularly to a system and method for using a shared bus for video communications.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As consumer demand increases for smaller and denser information handling systems, manufacturers strive to integrate more computer components into a smaller space. This integration has led to the development of several applications, including high density servers. A high density server provides the computer processing resources of several computers in a small amount of space. A typical arrangement for a high density server includes a shared power supply, a management module, a connection board (e.g., a back-plane or mid-plane) and server modules, such as blade server modules.

Blade server modules, or blades, are miniaturized server modules that typically share a common power supply and cooling system within a server. Typically, a blade includes a circuit board with one or more processors, memory, a connection port, and possibly a disk drive for storage. By stacking several blades in a server like books on a shelf, a high density server achieves significant cost savings over conventional servers. This saving is a direct result from the sharing of common resources (i.e., electrical power) and the reduction of space within the server while providing a significant increase in computer processing power.

Because each blade in a server may be viewed as a computer system, each blade may require separate input and output (I/O) connections. This creates a potential problem when there are several blades installed in a server and each requires a separate I/O connection for a video, keyboard and mouse (KVM) connection. Because the blades are ultra small and closely stacked in a server, connectivity (i.e., cabling) to each blade becomes quite difficult.

SUMMARY OF THE INVENTION

The present disclosure relates to a system and method for using a shared bus to control a video output in high density servers. According to an example embodiment, a computer system includes a mid-plane with a video bus. The computer system further includes at least one server module with a video output module. The video output module may transmit a video signal over the video bus and may receive a control signal from the video bus. Further included in the computer system is a management module in communication with the video bus. The management module receives the video signal from each of the server modules via the video bus and provides a control signal through the video bus to each server module. The control signal may control the video output module on each server module.

In another embodiment, an information handling system includes a server module that is communicatively coupled to a bus. The information handling system also includes means for receiving a control signal from the bus at the server module. The system further includes means for determining whether the control signal is addressed to the server module. Lastly, the system includes means for enabling and disabling production of video output in the server module in response to the control signal.

In an alternate embodiment, an information handling system includes a server module and a video output module in the server module. The video output module receives control signals from an external management module via a bus and transmits video signals to the external management module via the bus. Further included in the computer system is a switching unit in the video output module. The switching unit activates and deactivates the transmission of video signals from the video output module in response to the control signal.

In a further embodiment, a method of using a shared bus to control a video output in a computer system includes receiving a control signal at a server module from a management module via a bus. In response to the control signal, a video output signal is transmitted from the server module to the management module via the bus.

Technical advantages of certain embodiments of the present invention include the ability to use a single bus for communications with all of the server modules. Providing a shared communications path between a management module and each server module allows the computer system to have selectable video communications without the complexity of individual connections to each server module.

Other technical advantages of certain embodiments of the present invention include the ability for a user to select and use communications such as a video output from a specific server module. Furthermore, because a unique address for a server module may be defined by a location on the mid-plane, each server module may retain a modular feature by not having to be pre-defined with an address (e.g., placing jumpers or setting dip switches) before being placed in the computer system.

A further technical advantage of certain embodiments of the present invention includes bus communications that allow for removal of server modules without disrupting communication on the bus with other server modules. Because a controller switch may be used to enable and disable the transmission of video signals from a specific module, the removal of a first server module may cause the control signal to select a second server module in a server component. The second server module may begin to transmit video signals on the bus.

Furthermore, the addition of a second server module placed in communications with the bus may be initially set to a disabled state to avoid mixed communications with the first server module's communications on the bus. Transmission of video signals from a second server module may not be permitted until the second server module is selected for communications on the bus and the first server module is disabled for communications.

All, some or none of these technical advantages may be present in various embodiments of the present invention. Other technical advantages will be readily apparent to one skilled in the art from the following figures, descriptions, and claims.

BRIEF DESCRIPTION OF THE DRAWINGS

A more complete understanding of the embodiments of the present invention and advantages thereof may be acquired by referring to the following description taken in conjunction with the accompanying drawings, in which like reference numbers indicate like features, and wherein:

FIG. 4 illustrates a block diagram of an example embodiment of a shared bus for KVM communications according to the teachings of the present invention;

FIG. 5 illustrates a flowchart of an example embodiment of a process for receiving a server module into a server component according to the teachings of the present invention;

FIG. 6 illustrates a flowchart of an example embodiment of a process for switching from a first server module to a second server module in response to user input according to the teachings of the present invention; and FIG. 7 illustrates a schematic diagram of the example shared bus of FIG. 4 in greater detail according to the teachings of the present invention.

DETAILED DESCRIPTION

Preferred embodiments of the present invention and their advantages are best understood by reference to FIGS. 1 through 7, where like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices, as well as various input and output (I/O) devices, such as a keyboard, a mouse, and a video display. The information handling system may also include one or more buses operable to transmit communications between the various hardware components.

Figure 1:
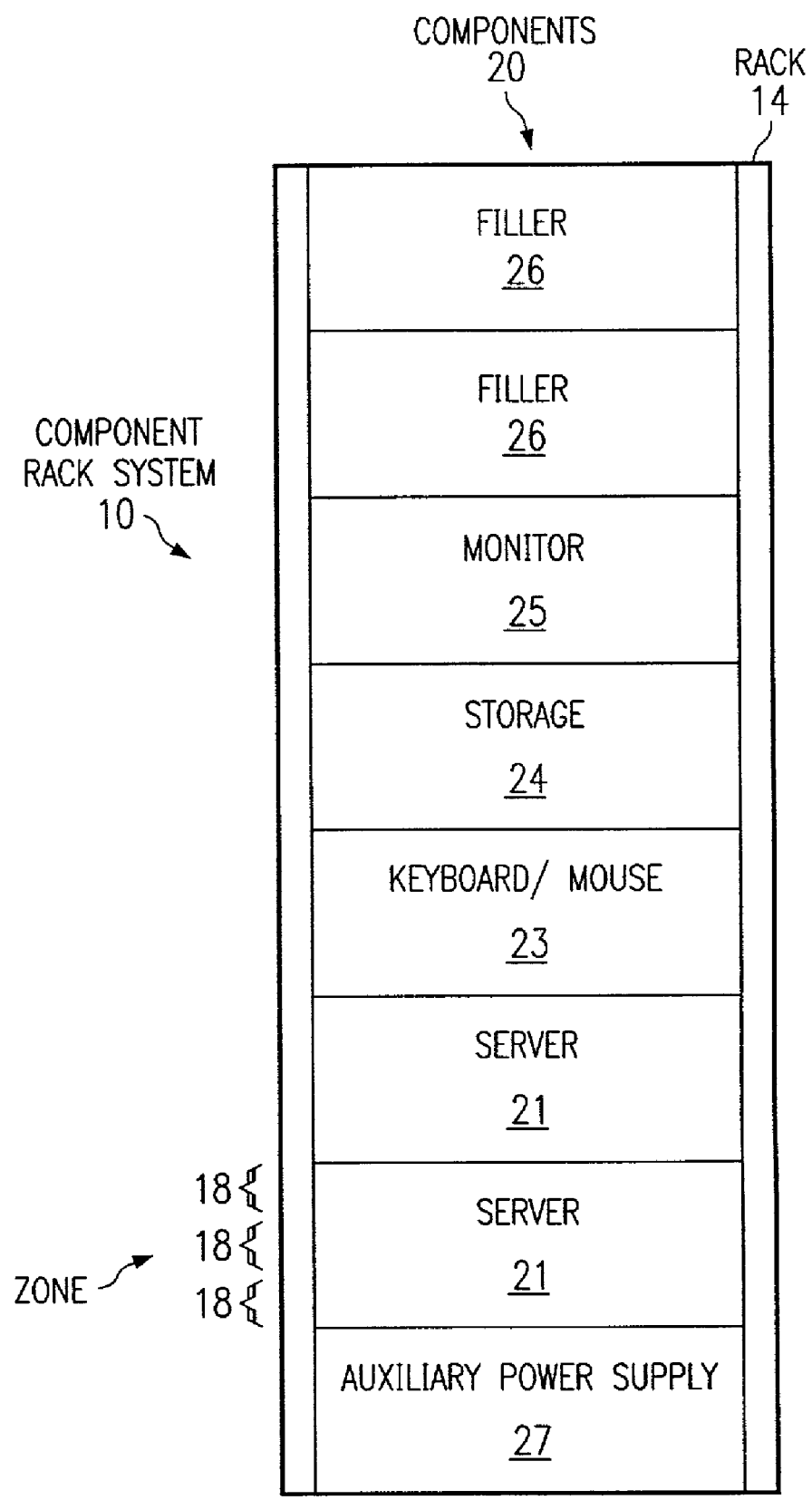
FIG. 1 illustrates a schematic front view of an example embodiment of a component rack system according to the teachings of the present invention.

FIG. 1 illustrates a schematic front view of an example embodiment of a component rack system 10. Component rack system 10 may be a type of information handling system, which may include rack 14 filled with components 20. Rack 14 may be divided into multiple zones 18 for receiving components 20. For example, zones 18 may comprise segments of rack 14 that are each 1.75 inches tall. Positions along rack 14 can then be referenced by a particular zone 18. For example, "zone 7" could be the seventh zone located above the bottom of rack 14.

Rack 14 may include several components 20 placed in zones 18 on rack 14. Typically, components 20 include auxiliary power supply component 27, server component 21, keyboard/mouse component 23, storage component 24, monitor component 25, and filler panel 26. Auxiliary power supply component 27 may be an uninterruptible power supply (UPS) that supplies power to other components 20 in case of power outages. Monitor component 25 and keyboard/mouse component 25 may be used as user interface connections to component rack system 10. Storage component 24 may be additional hard drives, disk drives or tape backup devices used for storing and retrieving data. Filler component 26 may be a faceplate used to avoid having blank spaces in rack 14. Server component 21 may include several computer processors, memory and possibly some storage devices. Typically, server component 21 may include any type of computer system, such as a high density server.

Typically, each of the components in rack 14 are designed in a modular fashion and each component provides some means of communication with the other components. Because server component 21 may include several server modules, a connection to each server module is needed. As described in greater detail below, to accommodate space and size constraints of a high density server component 21, connections to these modules may be provided over a bus connection, such as a shared bus for video communications according to the present invention.

Figure 2:
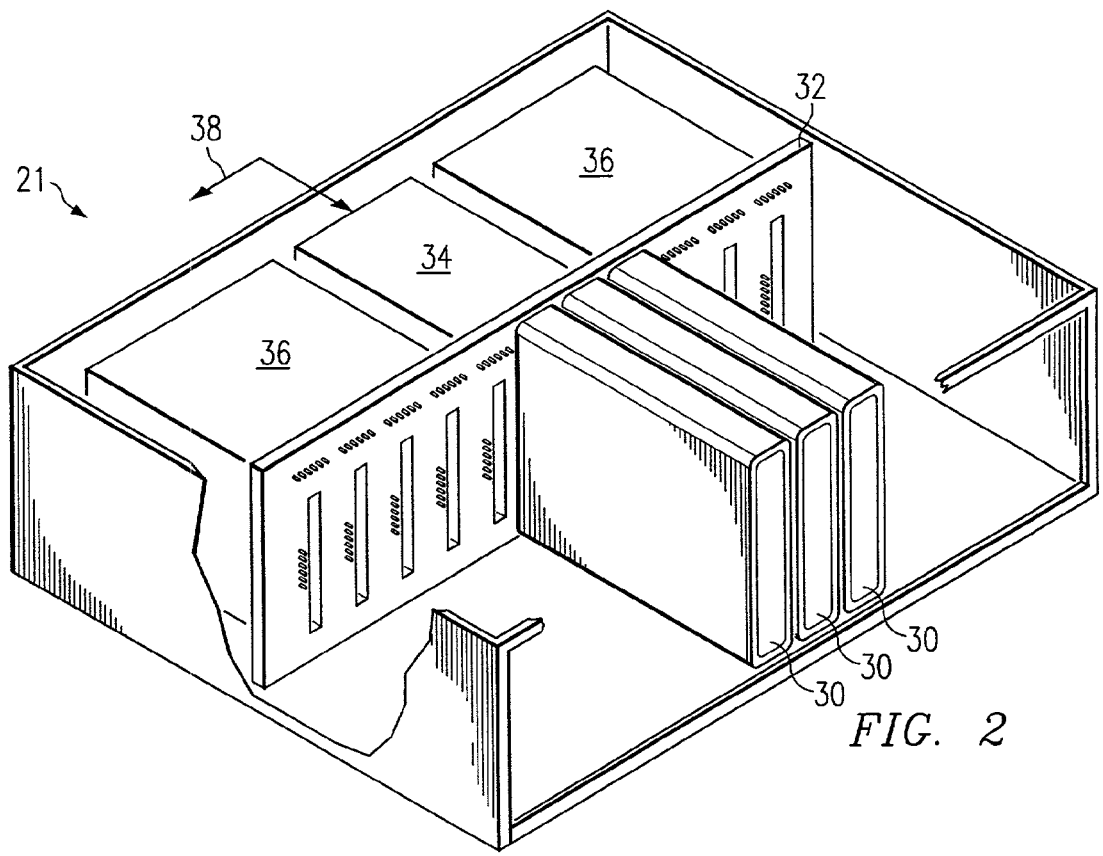
FIG. 2 illustrates a perspective view of an example embodiment of a server component according to the teachings of the present invention.

FIG. 2 illustrates a perspective view of an example embodiment of server component 21. In certain embodiments, server component 21 may be a high density server 21 that may include power supply module 36, management module 34, mid-plane 32, and multiple server modules 30. Server component 21 may be communicatively coupled to rack 14 and other components 20.

Typically, more than one power supply module 36 is included in each server component 21 to provide a redundant power source. As described in greater detail below, power supply module 36 may also supply an electrical voltage to each server module 30 for use in assigning a unique address for each server module 30.

Typically, management module 34 controls the connectivity of different server modules 30 and components 20 for server component 21. Management module 34 may receive KVM connection 38 and may include a master control circuit used to transmit control signals to all server modules 30 for enabling communications between a particular server module 30 and KVM connection 38. In some embodiments, management module 34 controls server modules 30 placed on an opposite side of mid-plane 32 within server component 21. In another embodiment, management module 34 may be placed external to server component 21 to control server modules 30.

KVM connection 38 may include a video output connection that provides a video output signal to monitor component 25, such as a display device. Further, KVM connection 38 may include a keyboard and a mouse input connection that receives a signal from keyboard/mouse component. 23, such as input devices. Alternatively, KVM connection 38 may connect to any other type of user interface device that may emulate KVM signals. Typically, KVM connection 38 may be used for input and output communications. For example, KVM connection 38 may be used to drive monitor component 25 while receiving input from keyboard/mouse component 23. Keyboard/mouse component 23 may include a keyboard and a mouse or other pointing devices.

Typically, each server module 30 has a circuit board with one or more processors, memory, a connection port, and possibly a disk drive for storage. Server module 30 may be any type of server or module placed into server component 21. For instance, server component 21 may be a SHREDDER server, and server modules 30 may be blade server modules. One such SHREDDER server may accept up to six blade server modules 30, with each server module 30 holding up to two processors. In an alternate embodiment, server component 21 may include a smaller or larger number of blade server modules 30.

Although FIG. 2 depicts mid-plane 32 as being placed between management module 34 and server modules 30, mid-plane 32 may be located anywhere on server component 21, even external to server component 21. In alternate embodiments, mid-plane 32 may be located along the back of server component 21 and may be referred to as a back-plane.

Figure 3:
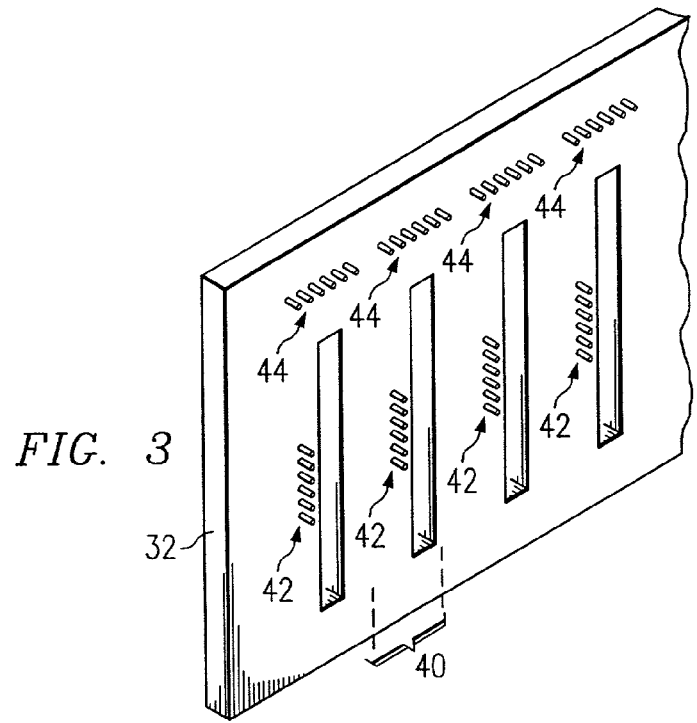
FIG. 3 illustrates a front view of an example embodiment of a mid-plane board from a high density server according to the teachings of the present invention.

FIG. 3 illustrates a front view of an example embodiment of a mid-plane 32 from a high density server 21. Mid-plane 32 may include several server module slots 40 on both front and back sides of the board to accept any number of server modules 30, depending upon the type of mid-plane 32. In certain embodiments, mid-plane 32 may receive up to eighteen modules in server module slots 40. But, all server module slots 40 do not need to be occupied with server module 30 in order for server component 21 to function properly. Because server component 21 may include several server modules 30, managing each server module 30 may require a method to identify each module placed in server component 21. Each server module 30 may be assigned a particular address based upon the location of the module on mid-plane 32, namely server module slot 40. A unique address may be created by employing any one of several different techniques, such as a software-defined address or resistor strapping for conductors 42.

Resistor strapping may include the use of resistors placed on conductors 42 in mid-plane 32 that connect with server module 30 upon placement on mid-plane 32. Either grounding or applying a voltage to each resistor may create voltages in conductors 42 that represent bits in a number. That number may be used as an address, and different arrangements of resistors for each slot may define a unique address for each slot. In one embodiment, resistor strapping uses five conductors 42 and five respective resistors for each slot to create the unique addresses. Applying a voltage to the first resistor and grounding the other four resistors may create a first address. Changing the location of the voltage to the second resistor and grounding the first, third, fourth and fifth resistor may create a second address. A third address may include the voltage applied to the first and second resistors with the third, fourth and fifth resistors grounded. Alternate embodiments may include less or more resistors and conductors to create unique addresses.

Conductors 42 assign the unique address to server module 30 as server module 30 is being attached to bus 44. After the unique address is assigned, bus 44 provides the control signal to server module 30 that directs the flow of communications along bus 44 between management module 34 and server module 30. In addition to carrying control signals, bus 44 may carry keyboard, video and mouse (KVM) signals, which may also be controlled by bus 44. Bus 44 may provide a shared transmission line or connection between all server modules 30 and management module 34 in server component 21.

FIG. 4 illustrates a block diagram of an example embodiment of a shared bus for KVM communications. At least one server module 30 may be placed on mid-plane 32 to be in communication with management module 34 via bus 44. Server module 30 may be one of several server modules 30 placed in server component 21, or it may be an external server able to be accessed by the computer system via bus 44. In one embodiment, server module 30 is a blade module placed in a high density server 21, such as a SHREDDER server.

FIG. 7 illustrates a schematic diagram of the example shared bus of FIG. 4 in greater detail. As shown, bus 44 may include one set of conductors for carrying control signals and another set of conductors for carrying video or KVM signals. The conductors for the control signals may be referred to as control lines 46, and the conductors for the video or KVM signals may be referred to as KVM lines 48.

Control lines 46 may use any type of communication protocol including, but not limited to, RS-485, RS-422, RS-232, RS-423, or any type of data communications used to communicate signals between devices. In one embodiment, the conductors within control lines 46 utilize a serial protocol to provide the control signals between management module 34 and all of server modules 30 located on bus 44.

Communications over KVM lines 48 may include data and clock information to video monitor, keyboard, and mouse components. In certain embodiments, KVM lines 48 may transmit data and clock information including red video, blue video, green video, horizontal sync, vertical sync, keyboard clock, keyboard data, mouse clock, mouse data, and "plug and play" device driver interface, such as power management controls and monitor adjustment controls.

As described below, being able to direct communications over the bus may prevent multiple streams of signals being sent over bus 44. Because each server module 30 may be assigned a unique address, each server module 30 may be accessed individually by the control signal carried on bus 44. Once accessed and selected, server module 30 may be in communication with keyboard/mouse component 23 and monitor component 25.

Communications on bus 44 may begin when a first server module 30 is placed into mid-plane 32. In most instances, this occurs when server module 30 is set into mid-plane 32 within server component 21. However, in some embodiments, server module 30 may be placed external to server component 21 and will need to be in communication with management module 34 via bus 44.

Referring again to FIG. 4, after server module 30 is placed into server component 21, server module 30 may be assigned a unique address that aids in controlling communication with management module 34 via bus 44. The unique address permits management module 34 to identify and select a particular server module 30 for communication. Because new server modules 30 may be added to server component 21 for communication with management module 34, server modules 30 are typically set to a default setting of not being enabled for communication upon placement into server component 21. This default mode may set controller switch 54 to a disabled position while allowing server module 30 to receive control signals that may enable controller switch 54. In the example embodiment, when a module is placed on bus 44, the server module 30 will not send video output signals to management module 34 until a transmit command signal is sent to server module 30 via bus 44 directing controller switch 54 to become enabled. This prevents multiple server module 30 from simultaneously sending communication signals to management module 34, as multiple simultaneous signals may cause confusion at a user interface, such as a display.

Control signals sent on bus 44 may originate at management module 34. Keyboard, video and mouse (KVM) controller module 50 may be located in management module 34 and used to generate control signals. These signals may be used to control the flow of communications between the user interface 62 and all server modules 30 located in server component 21 via bus 44. If there were no control of communications, all information might be sent on bus 44 simultaneously possibly causing confusion at user interface 62.

Controlling communications placed on bus 44 may begin with KVM controller module 50. In certain embodiments, KVM controller module 50 may include a video selection unit controller card coupled with management module 34 that provides the control signals to server modules 30. In another embodiment, KVM controller 50 may include a video selection unit in management module 34 that provides the control signals to server modules 30. KVM controller module 50 may transmit a first control signal directed to a particular server module 30 via bus 44. This control signal may include a unique address and an instruction command for enabling or disabling controller switch 54 on one server module 30. Typically, the first control signal transmitted to server module 30 via bus 44 is a disable signal. The following control signal may be an enable signal to another server module 30. By sending a disable signal first, no two server modules 30 may be transmitting communications on bus 44 at the same time.

After the control signal is sent to all server modules 30 via bus 44, each server module 30 may compare its unique address with the address sent with the control signal. When a server module 30 determines that its unique address matches the address in the control signal, that server module 30 performs the command sent by the signal. If the command is to enable controller switch 54, server module 30 enables controller switch 54, thereby permitting communications to be transmitted on bus 44. Similarly, if the command is to disable controller switch 54, server module 30 ceases to transmit communication signals via bus 44. In certain embodiments, the enabling and disabling function may include increasing the impedance level of the output signal generator.

For those server modules 30 whose unique address does not match the unique address sent on bus 44, these server modules 30 may ignore the command sent, remain in their current state, and continue to receive command signals from KVM controller module 50. Thus, communication may continue between enabled server module 30 and management module 34 without additional control signals being placed on bus 44.

Server module 30 with enabled controller switch 54 may receive communication signals, such as user input from management module 34. Because controller switch 54 is enabled, keyboard, video and mouse (KVM) device 56 located in enabled server module 30 may receive these communications signals. Additionally, KVM device 56 may transmit communication signals (e.g., video signals) to management module 34 via bus 44 as long as controller switch 54 remains enabled.

Communications signals that are sent by enabled server module 30 via bus 44 may be routed to KVM output 58 from KVM controller module 50. In certain embodiments, KVM output 58 may receive separate keyboard, video and mouse communications signals from KVM controller module 50. These separate KVM signals may be directed to different components in rack 14 along transmission lines 60. Transmission lines 60 may use any type of bus or communication protocol for receiving and transmitting information to server module 30 via management module 34. Typically, transmission lines 60 carry both communications and control instructions from user interface 62 to management module 34. User interface 62 may include keyboard/mouse component 23 and monitor component 25 as a means to display and generate I/O communications with server component 21. KVM controller module 50 may convert the communications and control signals and then place the converted signals onto bus 44 for reception by the active server module 30.

In some embodiments, user interface 62 may be used to select a particular server module 30 located in server component 21. In other embodiments, a particular server module 30 may be selected by a computer program. Selecting a particular server module 30 may be performed by selecting server module 30 from a list of available server modules 30. The list of available server modules 30 may include all server modules placed in server component 21 that are attached to midplane 32. In selecting server module 30 for use, a user may initiate a certain computer program or computer code that brings up a selectable menu of available server modules 30. For example, a user may select a different server module 30 by activating a "hot-swap key" sequence and enabling any available server module on bus 44.

FIG. 5 illustrates a flowchart of an example embodiment of a process for receiving server module 30 into server component 21. The illustrative process begins with server component 21 powered up and management module 34 active. At step 69, server module 30 is inserted into server component 21. After placing server module 30 into server component 21, a unique address may be assigned to server module 30 in order to receive control signals from management module 34 via bus 44. Typically, server module 30 is a modular design and may be placed at any location in high density server 21. Accordingly, at step 70, server module 30 is assigned a unique address. This unique address may be assigned by setting dip switches, moving "jumper" connections, running a computer program, installing a software chip, using resistor strapping, or by any other suitable means of assigning a unique address to server module 30. In certain embodiments, the unique address is designated by the location of server module 30 in server component 21, as described above.

Management module 34 may recognize new server module 30 placed in server component 21 via bus 44. At step 72, management module 34 sends a control signal to server module 30 via bus 44. All server modules 30 placed in server component 21 may receive the control signal. Since each server module 30 in communication with management module 34 is actively "listening" for its unique address in the control signal, the control signal may be compared to the unique address for each module at step 74

At step 76, each server module 30 may determine if its unique address matches the address of the control signal. If address of the control signal does not match the address of a server module 30, that server module 30 may ignore the command signal and await the next command signal. However, if the address in the control signal matches the address for a server module 30, that server module 30 may accept the command signal and proceed to determine the command.

Assuming that the unique address in the control signal matches the unique address of server module 30, server module 30 may make a further determination as to the type of command sent at step 78. The type of command signals may include a disable function, an enable function or any other suitable function for server module 30. In some embodiments, the control signal includes two functions for server module 30. The functions may be to either enable or disable a video output. If the signal were a disable command, server module 30 may disable a video output module by disabling controller switch 54 at step 80. Typically, the disable command is the first command sent from management module 34 to avoid the confusion of having more than one enabled server module 30 communicating on bus 44. If the signal were an enable function, server module 30 may enable the video output module by enabling controller switch 54 at step 82. Enabling the video output module permits the receipt and transmission of communications to management module 34 via bus 44.

After server module 30 becomes enabled, server module 30 may continue to be in communication with management module 34 via bus 44 until server module 30 is either disabled or removed from server component 21. The remaining server modules 30, which are disabled, may remain connected to server component 21 via bus 44 and may actively "listen" for their unique address in all subsequent command signals sent by management module 34.

FIG. 6 illustrates a flowchart of an example embodiment of a process for switching from first server module 30 to second server module 30 in response to user input. The illustrative process begins with first server module 30 enabled for KVM communications with management module 34 and second server module 30 disabled for communications with management module 34. To switch from first server module 30 to second server module 30, a user may use a keyboard, a mouse, a pointer, voice activation, or any other suitable input device for sending a signal to management module 34. In one embodiment, a user may activate a server selection engine by pressing a predefined sequence of one or more keys, commonly known as a "hot-swap key" sequence. The hot-swap key may start a special computer program allowing a user to enable any of server modules 30 placed on bus 44. Because each server module 30 has its own unique address, a user may be able to identify and select a particular server module 30.

At step 90, user input selecting second server module 30 is received at management module 34. The user input may be a KVM signal generated by a server selection engine. At step 92, management module 34 may determine the unique address for selected second module 30 and the unique address for the currently enabled module, namely first server module 30. In some embodiments, management module 34 may convert the KVM signal into a control signal that is placed on bus 44.

After determining the unique address for first server module 30 and second server module 30, management module 34 may transmit a first control signal to all server modules 30 via bus 44 at step 94. Typically, this first control signal includes the unique address of first server module 30 and a disable function. At step 96, all server modules 30 that are receiving communications via bus 44 receive the first control signal. A determination is made at each server module 30 whether to act on the first control signal or not. If the unique address matches server module 30, that server module 30 performs the function. In this case, the function commands first server module 30 to disable controller switch 54 at step 98. This disable function may be performed by increasing the impedance (e.g., increasing the resistance value of the transmitting signal generator) of the communications signal in order to prevent communications over bus 44 while still receiving further control signals. Other methods for enabling or disabling communications with server module 30 may include a computer software program, directing the communications to a null bus, disconnecting the communications means or any suitable means to prevent communications over a bus.

After the first command signal has been sent to disable first server module 30, a second control signal may be sent at step 100. This second control signal may include a unique address for second server module 30 and an enable function. At step 102, the second control signal is received at each server module 30. Because the second control signal may include the unique address for second server module 30, second server module 30 may perform an enable function at step 104. The enable function may include activating controller switch 54 on second server module 30. Second server module 30 may be enabled and accessed by user input via bus 44.

Although the present invention has been described with respect to a specific embodiment, various changes and modifications will be readily apparent to one skilled in the art. The present invention is not limited to the illustrated embodiment, but encompasses such changes and modifications that fall within the scope of the appended claims.

What is claimed is:

1. A computer system, comprising:
   a mid-plane including a shared bus, the mid-plane having a plurality of server slots, each server slot operable to receive a server module;
   at least one server module coupled to a mid-plane server slot and including a keyboard, video, mouse (KVM) device in communication with the shared bus, the KVM device operable to transmit a video signal over the shared bus and to receive control signals from the shared bus;
   a management module in communication with the shared bus, the management module operable to receive the video signal from each server module connected to the mid-plane via the shared bus and to provide the control signals through the shared bus to each server module to activate and deactivate the KVM device on each server module;
   wherein the management module is configured to receive a KVM connection from a user interface and further configured to enable communications between a particular server module and the KVM connection via the shared bus.

2. The computer system of claim 1, wherein each server module further comprises a unique address based on a server slot where the server module couples to the mid-plane, the unique address operable to identify each server module to the management module.

3. The computer system of claim 1, wherein each server slot comprises a connector operable to provide an interface between a server module and the mid-plane.

4. The computer system of claim 1, wherein the shared bus comprises serial control lines that carry the control signal and KVM lines that carry KVM signals including the video signal.

5. The computer system of claim 1, wherein the management module further comprises:
   an output module operable to drive a video display device of the user interface based on the video signal from the particular server module; and
   a controller unit operable to provide the control signals to the server modules.

6. An information handling system, comprising:
   a server module communicatively coupled to a midplane having a plurality of server slots and a shared bus and including a keyboard, video, mouse (KVM) device in communication with the shared bus, the KVM device operable to transmit a video signal over the shared bus and receive control signals from the shared bus;

a management module for transmitting control signals via the shared bus to the server slots wherein the control signals identify a particular server slot; and;

wherein the management module is configured:

to receive a KVM connection from an external user interface and further configured to enable communications between a particular server module and the KVM connection via the shared bus;

receive a video signal from the server module connected to the midplane via the shared bus and to provide the control signals through the shared bus to the server module to activate and deactivate the KVM device on the server module.

7. An information handling system, comprising:

a server module communicatively coupled to a bus of a mid-plane, the mid-plane having a plurality of server slots, each server slot operable to receive a server module;

unique address associated with the server module based on a location of the server module in the mid-plane, the unique address operable to identify the server module;

a keyboard, video, mouse (KVM) device in the server module and in communication with the bus, the KVM device operable to transmit video signals to the bus; and a management module operable to support a KVM connection to an external user interface and to transmit control signals to the server module via the bus to enable and disable transmission of video signals from the video output module to the external user interface by activating and deactivating the KVM device on the server module.

8. The information handling system of claim 7, further comprising:

one or more additional server modules communicatively connected to the external management module via the bus;

a server selection engine in the management module operable to receive user input selecting one of the server modules to drive a display device of the external user interface.

9. A method of using a shared bus to control video output in a computer system, the method comprising:

receiving a control signal at a keyboard, video, mouse (KVM) device of a server module from a management module via a bus within a mid-plane, the mid-plane having a plurality of server slots, the server module and the management module communicatively coupled with the mid-plane;

activating or deactivating the KVM device in response to the control signal from the management module, the video output module operable to generate a video output signal; and transmitting the video output signal from the server module to an external video display connected to the management module via the bus, in response to the control signal.

10. The method of claim 9, further comprising:

receiving user input at the management module to select the server module to drive a display device.

11. The method of claim 9, further comprising:

assigning a unique address for the server module, based on a location of the server module in a server rack containing the server module.

12. The method of claim 9, wherein the server module comprises a first server module and the control signal comprises a first control signal, the method further comprising:

transmitting a second control signal to disable the video output signal from the first server module; and transmitting a third control signal after the second control signal to enable video output from a second server module.

13. The method of claim 9, wherein the video output signal comprises a keyboard, video and mouse (KVM) signal transmitted along the bus.

14. The method of claim 9 wherein the server module comprises a first server module in a plurality of server modules; and the method further comprising allowing a user at a single video output connection to select which of the multiple server modules will transmit video output to the single video output module via the bus.

15. The method of claim 9, further comprising reducing an impedance level of a video output generator in the server module to enable transmission of the video output signal.

16. The computer system of claim 1, wherein the KVM connection includes a keyboard signal from an external keyboard, a mouse signal from an external mouse, and a video signal for an external video display.

17. The computer system of claim 16, wherein the management module is configured to communicate the video signal from a first server module to the video display and further configured to communicate the keyboard or mouse signal from the keyboard or mouse to a second server module.

18. The computer system of claim 16, wherein the video signal includes red video, blue video, and green video data.

19. The computer system of claim 18, wherein the video signal includes horizontal sync and vertical sync data.

* * * * *